United States Patent
Gignac et al.

[19]
[11] Patent Number: 5,915,777
[45] Date of Patent: Jun. 29, 1999

[54] CAB COMPARTMENT STORAGE SYSTEM

[75] Inventors: Christopher T. Gignac, Sylvan Lake; Robert L. Juzwiak, Plymouth, both of Mich.

[73] Assignee: Textron Automotive Company Inc., Troy, Mich.

[21] Appl. No.: 08/977,582

[22] Filed: Nov. 25, 1997

[51] Int. Cl.⁶ .............................. B60N 3/12; B60R 11/06
[52] U.S. Cl. ...................... 296/37.16; 224/543; 224/545; 224/547; 296/39.1
[58] Field of Search ................................ 224/547, 542, 224/543, 545; 211/88.01, 70.6, 64; 296/3, 8, 37.8, 37.13, 37.16, 146.7, 39.1; 220/482, 481

[56] References Cited

U.S. PATENT DOCUMENTS

| | | | |
|---|---|---|---|
| D. 190,552 | 6/1961 | Doucet | D6/548 |
| 412,499 | 10/1889 | Hamilton | 220/482 |
| 2,711,873 | 6/1955 | Larin | 220/481 |
| 2,730,263 | 1/1956 | Neilson | 220/482 |
| 2,764,384 | 9/1956 | Kirsch | 248/305 |
| 3,163,332 | 12/1964 | Boyle et al. | 220/482 |
| 3,325,038 | 6/1967 | Ferney | 52/11 |
| 3,479,085 | 11/1969 | Weinstein . | |
| 4,131,203 | 12/1978 | Bridges | 211/88.01 |
| 4,466,659 | 8/1984 | Carpentier et al. . | |
| 4,750,774 | 6/1988 | Pickering . | |
| 4,889,377 | 12/1989 | Hughes | 296/3 |
| 5,318,187 | 6/1994 | Rosenthal | 211/88.01 |
| 5,356,061 | 10/1994 | Yu . | |
| 5,415,457 | 5/1995 | Kifer . | |
| 5,492,257 | 2/1996 | Demick . | |
| 5,535,931 | 7/1996 | Barlow et al. . | |

FOREIGN PATENT DOCUMENTS

| | | | |
|---|---|---|---|
| 560812 | 10/1957 | Belgium | 220/482 |
| 541753 | 6/1957 | Canada | 220/482 |

Primary Examiner—Allan N. Shoap
Assistant Examiner—Maerena W. Brevard
Attorney, Agent, or Firm—Reising, Ethington, Barnes, Kisselle, Learman & McCulloch PC

[57] ABSTRACT

A cab compartment storage system has a modular, unitary support structure including a rear compartment trim panel connected to the back of a pick-up passenger compartment and at least one support rod with opposite ends connected to the rear compartment trim panel and wherein the support rod is spaced forwardly of the rear compartment panel between the opposite connected ends thereof to be placed on the pick-up compartment at the same time that the trim panel is connected in place; and wherein at least one upwardly open end container is connected on the support rod to depend from the support rod for providing article stowage within the cab storage compartment at a point closely proximate to the backs of a seating system located forwardly thereof within the passenger compartment.

23 Claims, 3 Drawing Sheets

CAB COMPARTMENT STORAGE SYSTEM

BACKGROUND OF THE INVENTION

The present invention relates to a cab compartment storage system for a pick-up truck or other vehicular applications having a cab compartment with a seating system therein. More particularly, this invention relates to cab compartment storage systems that are compactly arranged and are easily accessible.

People frequently use pick-up trucks or like cab compartment vehicles to transport items from one place to another. Workers in several fields, such as the construction industry, often place items such as tools and supplies inside the pick-up cab while traveling from one location to another. Additionally, the recent increase in popularity of pick-up trucks among the general population has resulted in more people using these trucks to transport items such as groceries and other household supplies. As a result, there is a need for cab storage systems that are easily accessible and have a large storage capacity.

U.S. Pat. No. 5,415,457 issued May 27, 1994 discloses an supporting attachment that is mounted on the back of a vehicle seat. The attachment includes hooks that are capable of holding items such as grocery bags. The system, however, is not capable of holding a wide variety of items and is not conveniently located for a conventional pick-up truck.

U.S. Pat. No. 5,356,061 issued Oct. 18, 1994 discloses a wire frame inside which items of various sizes can be placed and secured through the use of flexible strips. U.S. Pat. No. 4,466,659 issued Aug. 21, 1984 discloses a folding tray holder that can be removably attached to a seat. U.S. Pat. No. 3,479,085 issued Nov. 18, 1969 discloses a slip cover which is removably mounted on the back of an automobile seat. These systems are capable of holding objects of only limited sizes and are not easily accessible for most people inside two-seat pickup trucks.

U.S. Pat. No. 4,750,774 issued Jun. 14, 1988 discloses a storage compartment for a vehicle jack in a van or similar vehicle. U.S. Pat. No. 5,535,931 issued Jul. 16, 1996 discloses a storage system designed to fit in the wheel well of a vehicle such as a mini-van. These inventions do not disclose arrangements for holding objects of greatly varying sizes.

U.S. Pat. No. 5,492,257 issued Feb. 20, 1996 discloses a pull-down organizer that can be mounted on the back seat of a vehicle. When pulled down the organizer is capable of holding items such as shopping bags. This system is not easily accessible in pick-up trucks and is not very compact when in use.

While suitable for their intended purpose, the storage arrangements in the above patents systems do not provided a combination of compactness, ease of access in a pick-up cab environment and load carrying capacity for different sized articles of varying weight and shape.

What is desired is a cab compartment storage system for a pick-up truck or other cab type vehicle that is compact, easily accessible and is capable of storing a several articles of different shapes and sizes.

SUMMARY OF THE INVENTION

The cab compartment storage system of the present invention provides a compact, easily accessible arrangement that can support substantial loads in a manner that will prevent them from being released into the cab from their stored position.

More particularly an object of the present invention is to provide for such a cab compartment storage system having such compactness, ease of access and stowage by the feature of a modular unitary storage system including a rear compartment trim panel connected to the back of a pick-up passenger compartment and having at least one support rod having opposite ends fixedly connected to the rear compartment trim panel and wherein the support rod is spaced forwardly of the rear compartment trim panel between the opposite connected ends thereof and arranged to be connected to the back at the same time as is the trim panel and wherein one upwardly opening rigid container is connected for lift-off removal on the support rod to depend from the support rod for providing article stowage within the cab storage compartment at a point closely proximate to the backs of a seating system located forwardly thereof within the passenger compartment.

A further feature of the invention is to arrange at least two horizontally directed vertically spaced support rods on the rear panel each having opposite ends connected to the rear panel for forming a support across the width thereof and wherein the one open end container is connected to depend from one of the support rods and a second upwardly open ended rigid container is lift-off removable and dependent from the other of the support rods at a point spaced laterally of said one upwardly open ended container.

A still further feature is to provide such a plurality of containers wherein one of the containers has a greater depth than the other of the containers.

Yet another feature of the invention is to provide support rods formed as round-sectioned bars.

Still another feature of the invention is to provide support rods formed as square sectioned bars.

Still another feature of the invention is to provide support rods as rectangular sectioned bars.

Yet another feature of the invention is to provide lift-off connectors on the containers formed as hooks having a surface configuration that will conform to the outer shape of the support rods.

Still another feature of the invention is to provide open-end containers that have imperforate walls and bottoms.

Yet another feature of the invention is to provide such open-end containers wherein passages are provided for fluid drainage and for air circulation through the interior of the container walls.

These and other objects, features and advantages of the present invention will be further understood and appreciated by those skilled in the art by reference to the following specification, claims and appended drawings.

DETAILED DESCRIPTION OF PREFERRED EMBODIMENTS

Figure 1:
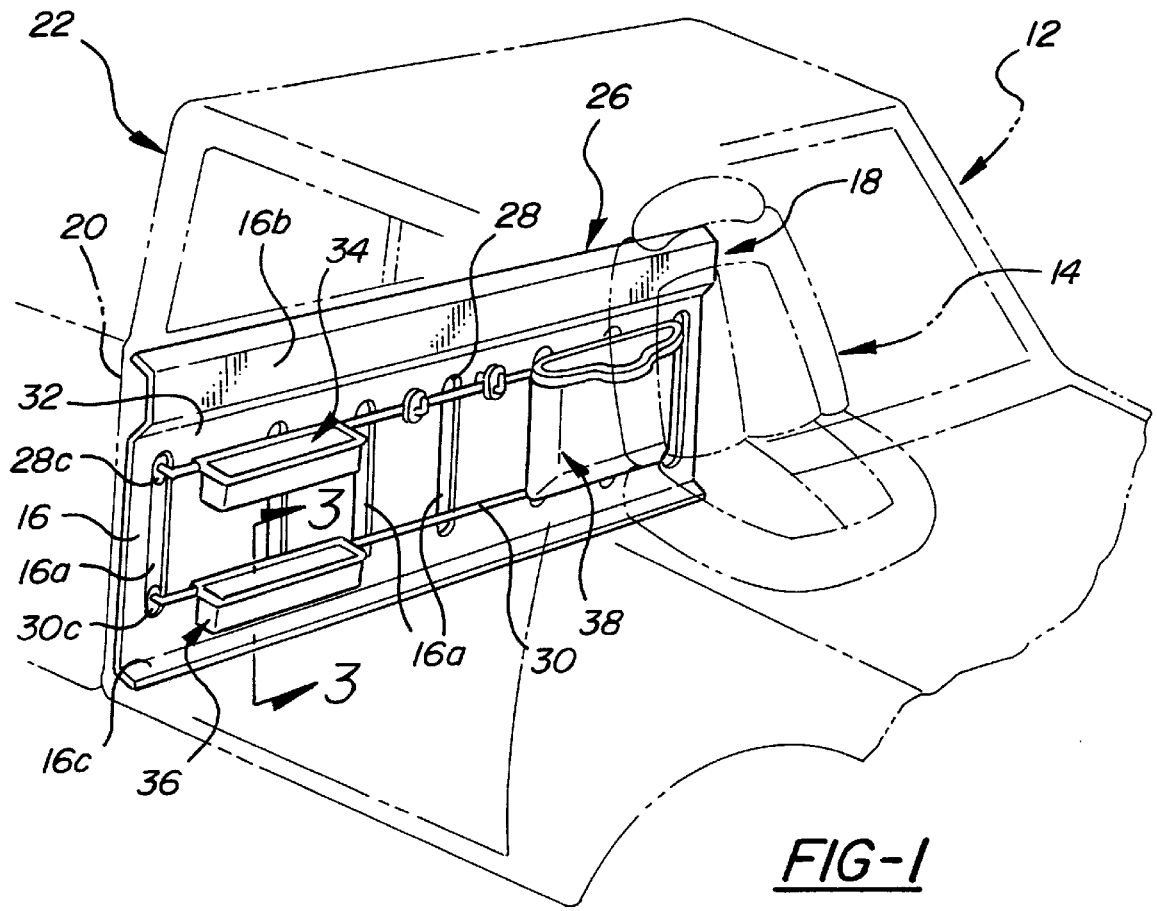
FIG. 1 is a fragmentary perspective view of a pick-up cab compartment storage system according to the present invention.
Figure 2:
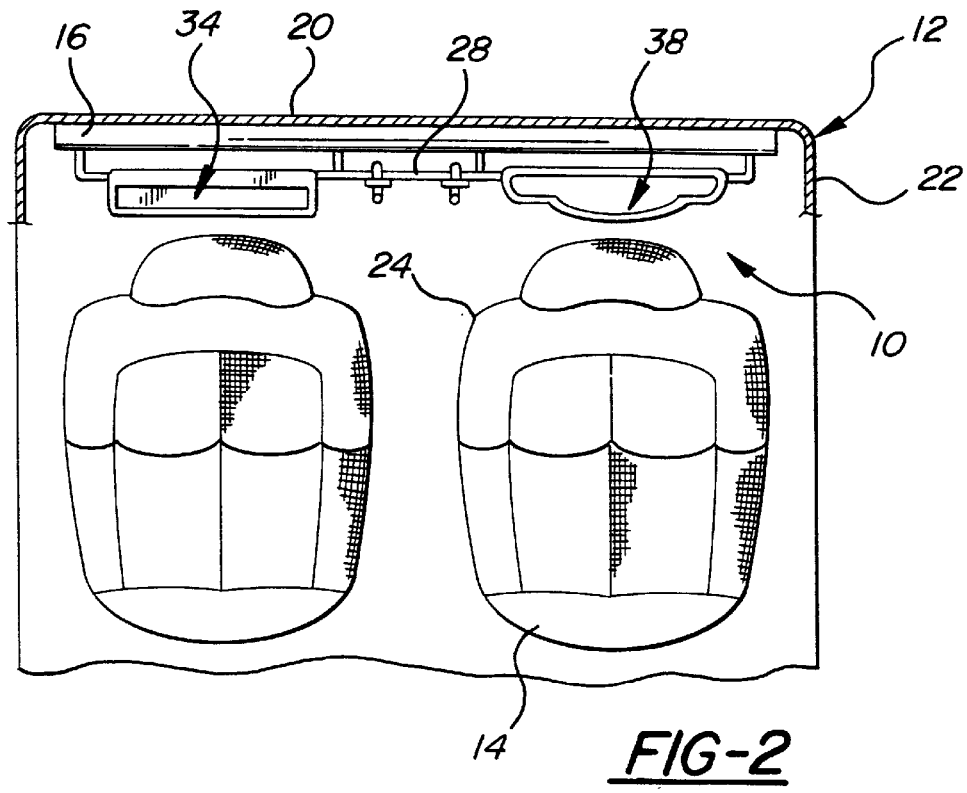
FIG. 2 is a fragmentary top elevational view of the invention.

Referring to FIGS. 1 and 2, a passenger compartment 10 of a pickup 12 is illustrated that has a seating system 14 located forwardly of a trim panel 16 of a cab compartment storage system 18. While a pickup is illustrated the cab compartment storage system is equally applicable to use in other vehicle passenger compartments.

The cab compartment storage system 18, as best shown in FIG. 1, is located at a point immediately forwardly of the rear wall 20 of the pick-up cab structure 22 and at a readily accessible point rearward of the back 24 of the seating system 14.

As shown in FIG. 2, the a trim panel 16 is supported on the front of the wall 20 and is configured to conceal the wall 20. The cab storage system 18 thereby is located so as to provide article stowage within the passenger compartment accessible by a passenger occupying the seating system within the passenger compartment.

The cab compartment storage system 18 has a support structure arrangement 26 that is formed as a unit for support on the cab structure 22. The unitary support structure arrangement 26 comprises the trim panel 16 and a pair of horizontal support rods 28, 30. Each support rod 28, 30 has opposite bent ends 28a, 28b and 30a, 30b, respectively. Fasteners secure the bent ends 28a, 28b, 30a to the trim panel 16. As illustrated, the fasteners are adhesive connected bosses 28c and 30c on the aforesaid bent ends for fixedly securing them in place. Other suitable fasteners, if desired, would include threaded connectors, barb type connectors or any other suitable arrangement that will fixedly connect the bent ends to the outboard surface 32 of the trim panel 16. The bent ends have a length that will space the support rods 28, 30 in front of the outboard surface 32 so that containers and other storage components can be readily secured in place thereon. If desired, bosses 28d, 30d connected to trim panel 16 by screws or rivets or adhesive can be provided on the rods 28, 30 between the ends thereof.

Figure 3:
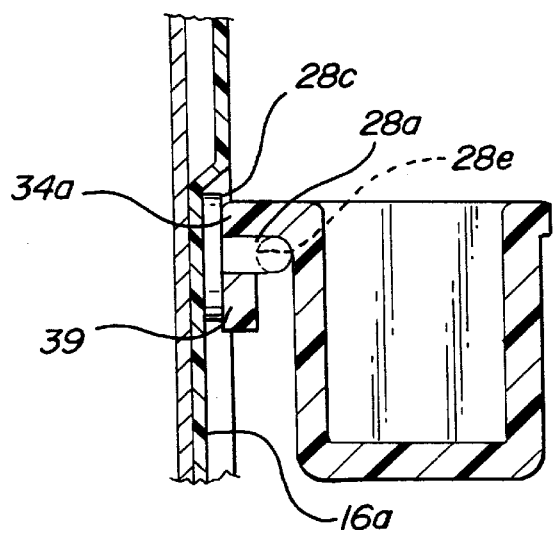
FIG. 3 is an enlarged fragmentary sectional view taken along the line 3—3 of FIG. 1.
Figure 5:
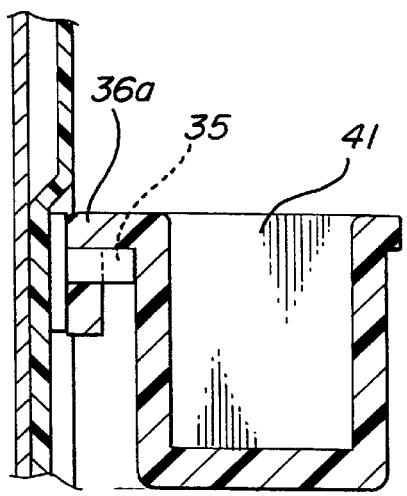
FIG. 5 is an enlarged fragmentary sectional view of another embodiment of the invention.
Figure 6:
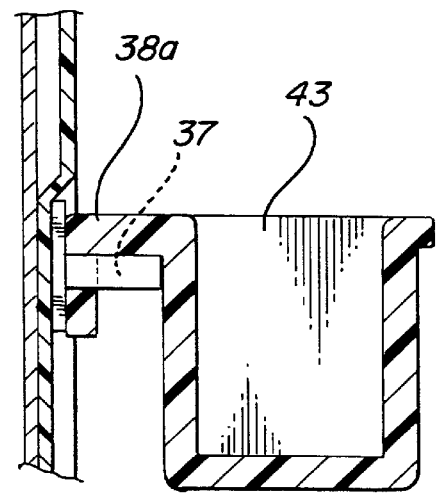
FIG. 6 is an enlarged fragmentary sectional view of another embodiment.
Figure 4:
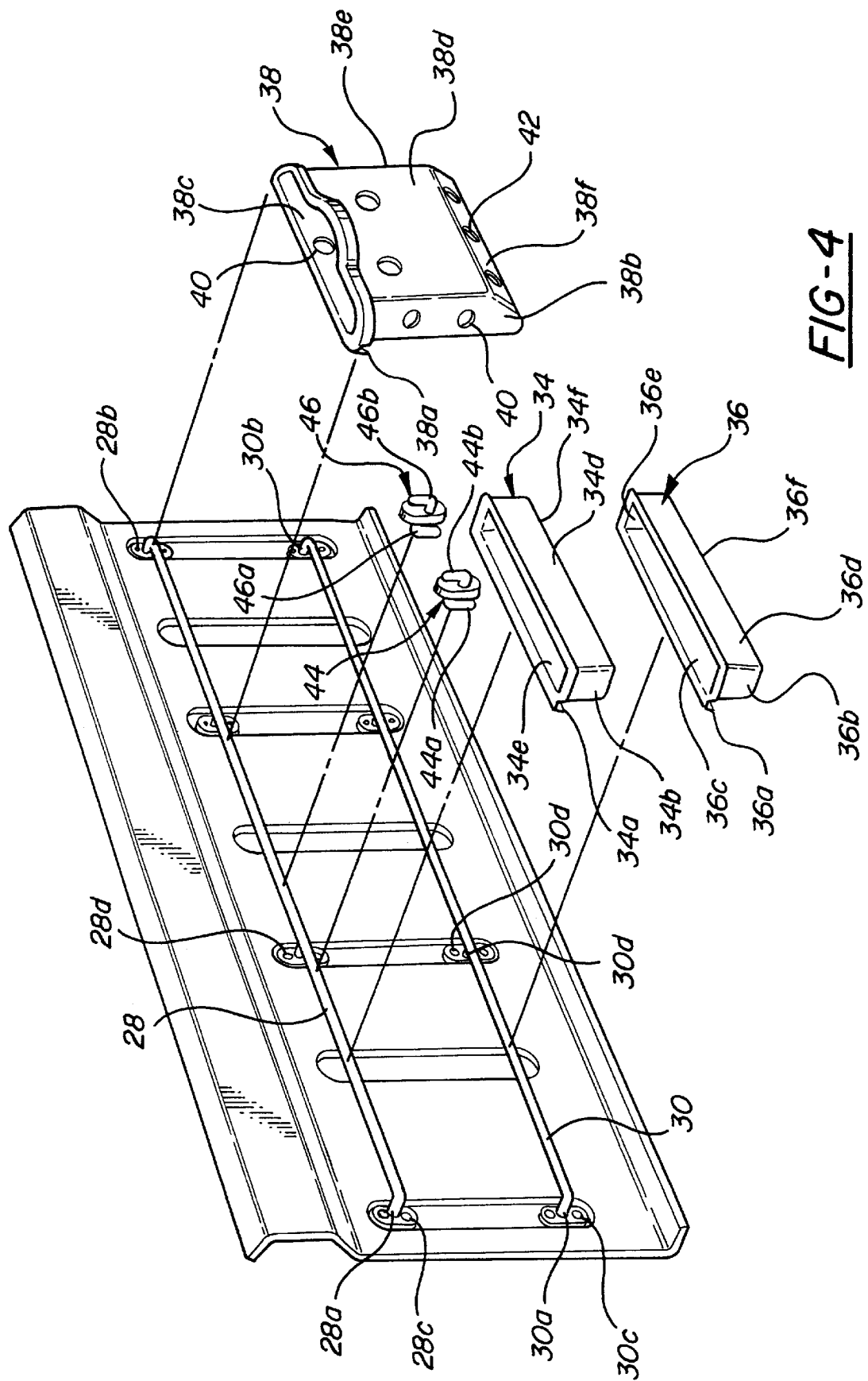
FIG. 4 is an exploded perspective view of a rear panel and container arrangement in the pick-up cab compartment storage system of FIG. 1.

The cross-section of the rod 28 is shown as a round section at 28e in FIG. 3. Other sections including square sectioned or rectangular sectioned rods as shown in the fragmentary sectional views of FIGS. 5 and 6 at 35 and 37, respectively, are equally suited for the present invention.

In each case, the containers 34, 36, 38 have hooks of the type shown at 34a in FIG. 3. Similar hooks are provided on containers at 36a and 38a in FIGS. 5 and 6. In each case the hooks conform to the shape of the support rods so as to assure a tight connection of the containers upon the rods that will in turn prevent undesirable vibrations or rattles.

The trim panel 16 includes vertically directed depressions 16a therein that will provide structural rigidity to the trim panel 16. It also includes a top channel 16b and a bottom flange 16c for additional strength.

In accordance with one aspect of the present invention, one or more solid wall, upwardly open rigid containers 34, 36 and 38 are provided for connection to the support rods 28, 30. In the illustrated arrangement, containers 34, 36 have solid perimeter walls 34b–34e and 36b–36e, respectively. The perimeter walls 34b–34e and 36b–36e are closed at their lower ends by a solid bottom wall 34f and 36f, respectively.

The containers 34, 36 are supported vertically with respect to each other on the support rods 28, 30 so as to be removably lifted on and off the rods. Additionally, a larger capacity container 38 is supported on the upper support rod 28 laterally of the containers 34, 36. The larger capacity container 38 includes perimeter walls 38b–38e and a base 38f. Vent holes 40 are provided in the walls 38b–38e and drain holes 42 are provided in the base 38 so that articles stored therein will be dry or dried. Container 38 lifts on and off the rods.

In addition to the container 34, 36, and 38 the storage system can further include double ended hooks 44, 46. Hook 44 has a hook end 44a connected to the support rod 28 and a second hook end 44b faced in a direction for connection to items such as umbrellas or other objects can be hung. Hook 46 is identical to hook 44.

The containers and hooks can be placed as desired on a strong system that will provide support and easy access to stored items. The advantage of the system is that the unitary support components thereof are easily assembled either as an original equipment feature or as an accessory feature on a wide range of vehicles having a rear cab wall located immediately behind and closely proximate the back of a seating system. While a two-seat arrangement is shown, a single bench seat can be used in association with the present invention.

Although the present invention has been described and illustrated in detail, it is to be clearly understood that the same is by way of illustration and example only and is not to be taken by way of limitation. The spirit and scope of the present invention are to be limited only by the terms of the appended claims.

What is claimed is:

1. In a vehicular compartment having a seating system therein, the combination of: a wall closing the back of the passenger compartment and disposed behind the seating system, a trim panel supported on said wall for concealing said wall;

at least one support rod having opposite ends fixedly connected to said trim panel and wherein the support rod is spaced forwardly of said trim panel between the opposite connected ends thereof; and an upwardly open end container configured to lift on and off said support rod and to depend from said support rod for providing article stowage within the passenger compartment accessible by a passenger occupying the seating system within the passenger compartment.

2. In the combination of claim 1, a second horizontally directed support rod on said trim panel located vertically with respect to said at least one support rod; said second horizontally directed support rod having opposite ends connected to said trim rear panel for forming a support across the width thereof and wherein said one open end container is connected to depend from one of the support rods and a second upwardly open end container connected to be lift on and off said other of the support rods and to depend therefrom at a point spaced vertically of said one upwardly open ended container.

3. In the combination of claim 1, a plurality of said upwardly open end containers supported on said support rod; one of said plurality of upwardly open end containers having a greater depth than the other of the upwardly open end containers.

4. In the combination of claim 1, a plurality of upwardly open end containers supported on said support rod; each of said plurality of upwardly open end containers being a rigid container.

5. In the combination of claim 1, a plurality of upwardly open end containers supported on said support rod; one of said plurality of upwardly open end containers having a greater volume than the other of said plurality of upwardly open end containers.

6. In the combination of claim 1, said wall configured as the rear wall of a pickup passenger compartment.

7. In the vehicular compartment storage system of claim 1, a connector on said upwardly open end container formed as a hook having a surface configuration conforming to the outer shape of said support rod.

8. In the vehicular compartment storage system of claim 1, said upwardly open end container having solid surface walls and a solid surface bottom.

9. In the vehicular compartment storage system of claim 1, said upwardly open end container having walls and a bottom; openings in said walls and said bottom for fluid drainage and for air circulation through the interior of said upwardly open end container.

10. In the vehicular compartment storage system of claim 7, a plurality of upwardly open end containers supported on said support rod; one of said plurality of upwardly open end containers having a greater depth than the other of said upwardly open end containers.

11. In the vehicular compartment storage system of claim 7, a plurality of upwardly open end containers supported on said support rod; each of said plurality of upwardly open containers being a rigid container.

12. In the vehicular compartment storage system of claim 7, a plurality of upwardly open end containers supported on said support rod; one of said plurality of upwardly open end containers having a greater volume than the other of said plurality of upwardly open end containers.

13. In a vehicle cab including a seating system within a passenger compartment, the combination of a wall enclosing part of said passenger compartment: a trim panel covering said wall and connected to said wall for providing an interior finish on said wall; and at least one support rod having opposite ends fixedly connected to said trim panel and wherein the support rod is spaced forwardly of said trim panel between the opposite connected ends thereof; and an upwardly open end container connected to lift on and off said support rod and to depend from said support rod for providing article stowage within the passenger compartment accessible by a passenger without departing from the seating system within the passenger compartment.

14. In the combination of claim 13, a second horizontally directed support rod on said trim panel located vertically with respect to said at least one support rod; said second horizontally directed support rod having opposite ends fixedly connected to said trim rear panel for forming a support across the width thereof and wherein said one open end container is connected to depend from one of the support rods and a second upwardly open end container connected to be lift on and off said other of the support rods and to depend therefrom at a point spaced vertically of said one upwardly open ended container.

15. In the combination of claim 13, a plurality of said upwardly open end containers supported on said support rod; one of said plurality of upwardly open end containers having a greater depth than the other of the upwardly open end containers.

16. In the combination of claim 13, a plurality of upwardly open end containers supported on said support rod; each of said plurality of upwardly open end containers being a rigid container.

17. In the combination of claim 13, a plurality of upwardly open end containers supported on said support rod; one of said plurality of upwardly open end containers having a greater volume than the other of said plurality of upwardly open end containers.

18. In the combination of claim 13, a connector on said upwardly open end container formed as a hook having a surface configuration conforming to the outer shape of said support rod.

19. In the combination of claim 13, said upwardly open end container having solid surface walls and a solid surface bottom.

20. In the combination of claim 13, said upwardly open end container having walls and a bottom; openings in said walls and said bottom for fluid drainage and for air circulation through the interior of said upwardly open end container.

21. In the combination of claim 20, a plurality of upwardly open end containers supported on said support rod; one of said plurality of upwardly open end containers having a greater depth than the other of said upwardly open end containers.

22. In the combination of claim 20, a plurality of upwardly open end containers supported on said support rod; each of said plurality of upwardly open containers being a rigid container.

23. In the combination of claim 20, a plurality of upwardly open end containers supported on said support rod; one of said plurality of upwardly open end containers having a greater volume than the other of said plurality of upwardly open end containers.

* * * * *